United States Patent [19]
Murphy et al.

[11] Patent Number: 5,265,216
[45] Date of Patent: Nov. 23, 1993

[54] HIGH PERFORMANCE ASYNCHRONOUS BUS INTERFACE

[75] Inventors: Ciaran P. Murphy, Bray; Tadhg Creedon, Rathgormac; Con D. Cremin, Clonmel, all of Ireland

[73] Assignee: Digital Equipment Corporation, Maynard, Mass.

[21] Appl. No.: 724,530

[22] Filed: Jun. 28, 1991

[51] Int. Cl.⁵ .............................. G06F 13/36
[52] U.S. Cl. .................. 395/325; 364/DIG. 1; 364/239; 364/240.8; 364/270.5; 364/271; 364/271.5
[58] Field of Search .............. 395/325, 725, 550; 370/85.1, 91, 94.2

[56] References Cited

U.S. PATENT DOCUMENTS

| | | | |
|---|---|---|---|
| 3,999,163 | 12/1976 | Levy et al. | 340/172.5 |
| 4,547,880 | 10/1985 | DeVita et al. | 370/91 |
| 4,615,017 | 9/1986 | Finlay et al. | 395/325 |
| 4,639,861 | 1/1987 | Appiano et al. | 364/200 |
| 4,831,520 | 5/1989 | Rubinfeld et al. | 395/325 |
| 4,891,768 | 1/1990 | Willems et al. | 364/518 |
| 4,992,930 | 2/1991 | Gilfeather et al. | 364/200 |
| 5,003,465 | 3/1991 | Chisolm et al. | 364/200 |
| 5,070,443 | 12/1991 | Priem et al. | 395/725 |
| 5,079,696 | 1/1992 | Priem et al. | 395/500 |
| 5,097,437 | 3/1992 | Larson | 395/775 |

Primary Examiner—Debra A. Chun
Attorney, Agent, or Firm—Kenyon & Kenyon

[57] ABSTRACT

A bus interface coupling an asynchronous bus and a slave device, such as a memory. The bus interface comprises an asynchronous bus controller and a synchronous bus controller. The asynchronous bus controller is implemented as two PAL state machines. One state machine controls the connection and disconnection phases of the bus protocol, while the other controls the data transfer phase. The synchronous bus controller controls data transfer between the bus and the slave device. The state machines are closely interlinked to each other and the synchronous bus controller allowing for increased bus efficiency.

8 Claims, 9 Drawing Sheets

*FIG. 7A*
WRITE TIMING (MAXIMUM)

MAX DS→DI/DK RELEASE = 25.5 nSEC

*FIG. 7B*
READ TIMING (MAXIMUM)

MAX DS→DI/DK RELEASE = 21 nSEC

FIG. 8

HIGH PERFORMANCE ASYNCHRONOUS BUS INTERFACE

FIELD OF THE INVENTION

The present invention is directed to an interface for coupling a device to an asynchronous bus. More particularly, the present invention relates to a high efficiency asynchronous bus interface.

BACKGROUND OF THE INVENTION

In a computer system, a plurality of devices such as computer processors, memories, communication devices, etc. are typically coupled together via a common bus. As more devices are added to the bus, the efficiency of the entire system depends on the speed at which transactions between devices take place on the bus. A typical series of bus transactions occurs between a master processing device and a slave memory device. In this series of transactions, the master will transmit a request, via the bus, to all of the other devices coupled to the bus. It is up to the slave to determine whether or not it has been selected by the master. The selected slave will then send an acknowledgement to the master, thus establishing communication between the two devices. Next, data is transferred between the master and slave according to the original request. Finally, the master terminates the transaction with the slave and releases the bus.

A short turnaround time delay between the master's request and the slave's response is important for efficient bus performance. This is achieved with a quick slave-bus interface controller. If the network bus is asynchronous, it is advantageous to make the slave-bus interface side of the controller asynchronous to take full advantage of the speed afforded by the asynchronous bus. This is generally accomplished using a state machine implemented as a programmable array logic (PAL) device. In an asynchronous bus protocol that utilizes a plurality of handshaking signals between a master and a slave to affect bus transactions, a large PAL may be required to detect and generate the appropriate handshaking signals. The operating speed of a PAL is a function of the number of terms that must be handled, and the large PAL that may be required by the asynchronous bus protocol will not provide an acceptable turnaround speed, particularly in high performance computer systems.

Thus, there is a need for an asynchronous bus interface controller that can accommodate a plurality of handshaking signals and which operates with a quick turnaround time. There is also a need for an asynchronous bus interface controller that is easily adaptable to different devices coupled to a standardized network bus.

SUMMARY OF THE INVENTION

The asynchronous bus interface controller of the present invention is implemented as two state machines utilizing two smaller and faster PAL devices. The first state machine is utilized as an address phase controller which controls the connection and disconnection phases of the bus protocol. The second state machine is utilized as a data phase controller which controls the data transfer phase of the bus protocol. The two state machines are closely interlinked, exchanging handshaking signals quickly and efficiently.

The asynchronous controller utilizes four handshaking signals with a synchronous "back-end" controller, which interfaces with the memory of the slave device and a transceiver coupled directly to the bus. The back-end controller also asserts the proper bus status signals and controls the data flow between the memory and the bus. One of these handshaking signals is used as an advance warning that more data is imminent at the bus transceiver inputs, on a read operation, or the data at the bus transceiver inputs is soon to be latched, on a write operation. This handshaking signal also initiates a delay. In response to the signal, the asynchronous controller sends back a second handshaking signal to the back-end controller if another bus request for a read or write is present. When the delay has timed out, the data at the transceiver will be clocked out, on a read operation, or latched in, on a write operation. Therefore, there is no lag when reading or writing successive blocks of data, and a certain amount of pipelining is achieved in the operation of this interface.

To increase the efficiency of the asynchronous bus, one of the state variables for the data phase controller also serves as the latch enable and clock for a transceiver which is coupled between the memory of the slave and the bus. When changing states in the data phase controller, the same state variable always changes first, setting off a delay and causing the state to change from a stable to a cycle state. When the delay has timed out, the state changes to the appropriate next stable state.

By using one of the state variables in this manner, several advantages are realized. First of all, delaying the changing of states insures that skewing errors seen in propagating signals on the bus will not occur. Also, using one of the state variables as a latch enable and clock on the bus transceiver allows data to be read from or written to the memory before the handshaking signals are stable on the bus. Because one of the state variables is used for these operations, the state machine has fewer terms and operates at a faster speed.

DETAILED DESCRIPTION

Figure 1:
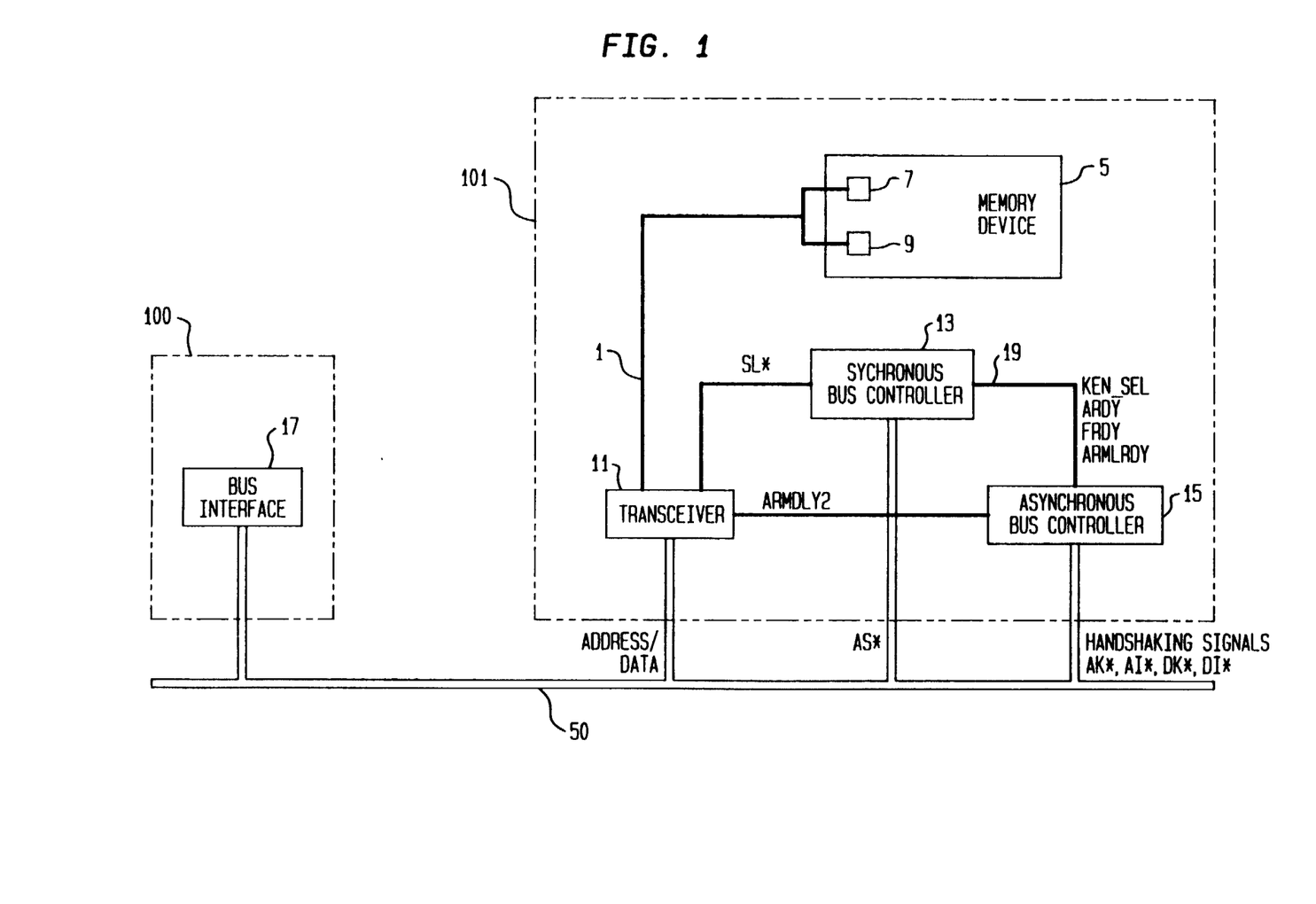
FIG. 1 is a block diagram of a computer system including a master/slave coupling through a system bus.

Referring to FIG. 1, there is illustrated a block diagram of a computer system incorporating a bus interface according to the present invention. In this embodiment, two components are coupled to an asynchronous bus 50. The first component comprises a master 100 that operates to read and write data over the system bus from/to the second component that comprises a slave 101. The master 100 can be any of a variety of devices such as an I/O controller or a central processing unit. The slave 101 can comprise, for example, a memory device to be used by the master 100 for the storage of data. Pursuant to a feature of the present invention, the slave 101 comprises a synchronous multiplex address-/data bus 1 which is coupled to each of a memory device 5 and a transceiver 11. The transceiver 11 operates as a latch in a write transfer of data to the memory device 5 and operates as a flip-flop in a read transfer of data from the memory device 5. In order to store address and data information used for read and write operations, the memory device 5 can be coupled to the bus 1 via an address latch 7 and a data latch 9 for input of address information and input/output of write and read data, respectively. The input and output data comprises data packets received and transmitted by other components, such as the master 100 coupled to the synchronous bus 50.

The transceiver 11 is also coupled to the address/data lines of the asynchronous system bus 15 for transfer of address information and data between the bus 1 and the bus 50. A synchronous bus controller 13 is further coupled to an asynchronous bus controller 15, that is, in turn, coupled to control lines of the asynchronous bus 50, as will be described in more detail below. The asynchronous bus interface of the memory slave comprises the synchronous bus controller 13 and the asynchronous bus controller 15. The synchronous bus controller 13 controls the synchronous multiplex address/data bus 1 for stabilization of address information and data on the bus 1 and also synchronizes the operation of the multiplex address/data bus 1 with the phases of the asynchronous bus 50 via the asynchronous bus controller 15, as will now be described.

The bus 50 can be implemented according to the Futurebus asynchronous bus protocol promulgated by the IEEE (ANSE/IEEE Std. 896.1). The IEEE standard Futurebus protocol implemented on the bus 50 operates on a master/slave basis. A master is defined as a module that has acquired control of the bus 50 through the control acquisition procedure provided in the Futurebus protocol. A slave is defined as a module that is capable of being addressed by and is able to carry out transactions with a master.

In order to maximize the performance of the asynchronous bus based network, the synchronous and asynchronous bus controllers 13, 15 of the slave 101 have been implemented to provide high speed data transfers over the bus 50 during each bus transaction.

A bus transaction in the Futurebus protocol comprises three phases, as follows:

1) a connection phase: the bus master selects and establishes a connection to a desired slave;
2) a data transfer phase: where data are interchanged between the master and the connected slave; and
3) a disconnection phase: where the master terminates the transaction and disconnects from the slave.

The Futurebus protocol provides for asynchronous handshaking during each bus transaction for high speed synchronization between the master 100 and slave 101 during the transmission of address information and data over the bus 50. The handshaking occurs over control lines of the bus 50 and includes three address handshake signals and three data handshake signals for data valid and acknowledge indications during address and data transfers, as follows:

address handshake

ADDRESS SYNC (AS*) is a synchronization signal controlled by the master 100 that handshakes with the following corresponding signals asserted by the slave 101 in response to the AS* signal, the AS* signal indicates that the address information is stable on the address/data lines of the bus 50;

ADDRESS ACKNOWLEDGE (AK*) is an acknowledge signal controlled by the slave 101 to handshake with the AS* signal asserted by the master 100;

ADDRESS ACKNOWLEDGE INVERSE (AI*) is an additional acknowledge signal controlled by the slave 101 to handshake with the AS* signal asserted by the master 100;

data handshake

DATA SYNC (DS*) is a synchronization signal controlled by the master 100 that handshakes with the following corresponding signals asserted by the slave 101 in response to the DS* signal. In the case of a write, the DS* signal indicates that the data is stable on the address/data lines of the bus 15, and in the case of a read, the DS* signal indicates that the master 100 is requesting more data;

DATA ACKNOWLEDGE (DK*) is an acknowledge signal controlled by the slave 101 to handshake with the DS* signal asserted by the master;

DATA ACKNOWLEDGE INVERSE (DI*) is an additional acknowledge signal controlled by the slave 101 to handshake with the DS* signal asserted by the master 100.

The asynchronous bus controller 15 is responsible for completing the handshake scheme with the bus interface 17 of the master 100 in an asynchronous operation. Moreover, the synchronous and asynchronous bus controllers 13, 15 of the slave 101 are designed to interact with one another through their own handshake scheme that does not depend upon the specific capabilities of the synchronous bus controller 13 in performing its logic operations such as address decode and memory access. The synchronous and asynchronous bus controllers 13, 15 are coupled together by a point-to-point connection 19 which passes signals designated as KEN_SEL, ARDY, FRDY, and ARMRDY (described below).

Figure 2:
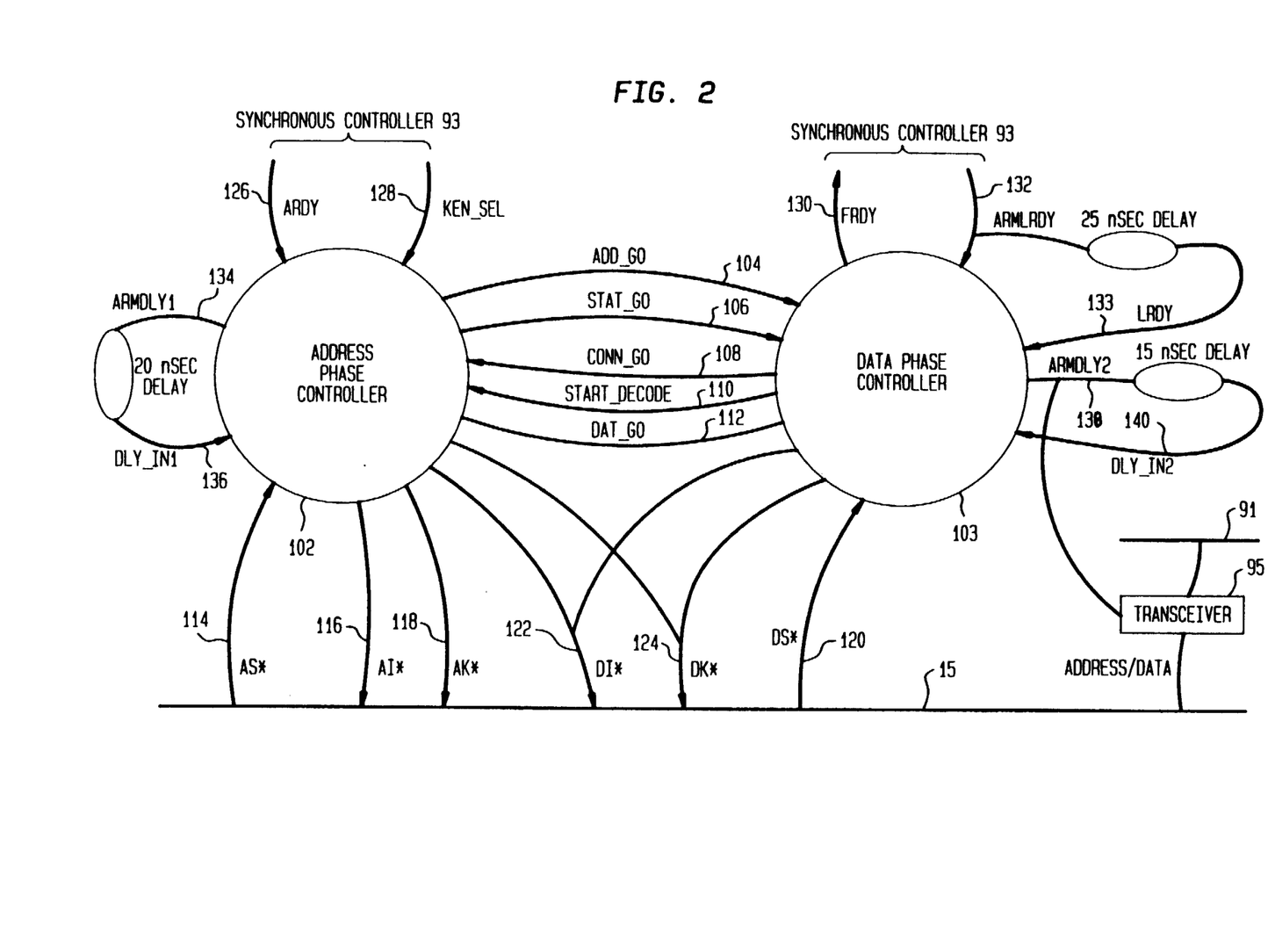
FIG. 2 is a block diagram of the asynchronous bus controller of FIG. 1.

In order to achieve as high a performance asynchronous interface as possible between the asynchronous bus controller 15 and a respective bus interface 17, the asynchronous bus controller 15 is split into two individual state machines, an address phase controller 102 to control the connection and disconnection phases of the Futurebus protocol and a data phase controller 103 to control the data transfer phase of the protocol, as illustrated in FIG. 2. The splitting of the asynchronous bus controller 15 into two state machines allows the controller to be implemented in two seven term equation, 4.5 nsec. 16L8 PALs rather than one large but slow 10 nsec. PAL. The two state machines 102, 103 are closely interlinked.

Referring now to FIG. 2, there are five signals exchanged between the address phase controller 102 and the data phase controller 103. An ADD_GO signal 104 indicates that the address phase controller 102 is done processing for the time being and enables the data phase controller 103 to change states. When negated, a STAT_GO signal 106 indicates to the data phase controller 103, that the address phase controller 102 has finished the connection phase and the data phase controller 103 is to commence the data transfer phase. A CONN_GO signal 108 indicates to the address phase controller 102 that the data phase controller 103 is ready for the data transfer phase. A START_DECODE signal 110 indicates that the data phase controller 103 is not in the data transfer phase and is awaiting information from the address phase controller 102. A DAT_GO signal 112 indicates the commencement of the data transfer phase.

The difference between the DAT_GO signal 112 and the STAT_GO signal 106 is that the DAT_GO signal 112 generates its value based on the state variables of the address phase controller 102. Each of the START_DECODE signal 110 and CONN_GO signal 108 is generated with the state variables of the data phase controller 103.

The handshake signals required by the Futurebus protocol are exchanged between the state machines 102, 103 and the bus 50. The AS* signal 114 is received by the address phase controller 102 from the bus 50, while each of the AI* signal 116 and the AK* signal 118 is sent to the bus 50 by the address phase controller 102. The DS* signal 120 is received by the data phase controller 103 from the bus 50, while each of the DI* signal 122 and the DK* signal 124 is sent to the bus 50 by the data phase controller 103. Both the address phase controller 102 and data phase controller 103 control the DI* signal 122 and DK* signal 124.

The synchronous bus controller 13 monitors the AS* control line of the bus 50 and asserts and sends an ARDY signal 126 to the address phase controller 102 when it sees the AS* signal ("address sync" signal asserted by the master 100 during the connection phase to inform the slave 101 that address and command data are valid on the bus 15) and has decoded the address on the bus 50.

Before completion of the address decoding and if the synchronous bus controller 13 has determined that the slave 101 has been selected and should participate in the bus transaction, the synchronous bus controller 13 will also assert and send an SL* signal (indicating that the 101 has been selected) to the transceiver 95 and a KEN_SEL signal 128 to the address phase controller 102.

The data phase controller 103 generates and sends an FRDY signal 130 to the synchronous bus controller 13 and receives an ARMLRDY signal 132 from the synchronous bus controller 13. The ARMLRDY signal 132 is also coupled to a 25 nsec. delay which results in a second signal, an LRDY signal 133 that is received at the data phase controller 103. The ARMLRDY signal 132 is an advance warning that data is imminent at the bus transceiver 11 (if executing a read operation) or data in the bus transceiver 11 is soon to be latched (if executing a write operation). The FRDY signal 130 is toggled by the data phase controller 103 immediately if another DS* signal 120 has come in from the bus 50 in the meantime (See states B 206 and D 218 of the data phase controller 103, FIGS. 4A and 4B) The synchronous bus controller 13 will interpret the received FRDY signal 130 as another read or write request. When the 25 nsec. delay line has timed out, the resulting LRDY signal 133 causes the data phase controller 103 to clock out the new data on a read or open the latch 11 on a write. This allows for a high degree of pipelining to be achieved in the slave 101.

There are several delay signals used in the state machines 102, 103. The purpose of these signals is to insure that signals asserted onto the bus 50 or received from the bus 50 have been appropriately latched. Also, these delays eliminate skewing errors that occur in the propagation of a series of signals. In the address phase controller 102, the assertion of an ARMDLY1 signal 134 will result in a return DLY_IN1 signal 136 to the address phase controller 20 nsec. later. The DLY_IN1 signal 136 is used to control certain state changes in the address phase controller 102, as will appear.

In the data phase controller 103, an ARMDLY2 signal 138 serves two purposes. First, the ARMDLY2 signal 138 serves as one of the state Variables of the data phase controller 103. When the ARMDLY2 signal 138 is asserted, it sets off a 15 nsec. delay resulting in the receipt of a DLY_IN2 signal 140 at the data phase controller 103 used to control state changes in the data phase controller 103. There are four stable states in the data phase controller 103 and three state variables. Each transfer between stable states begins with the toggling of the ARMDLY2 signal 138, thus insuring at least a 15 nsec. delay between stable states. The synchronous bus controller 13 uses the delay to assert its own signals in proper timing.

The second use for the ARMDLY2 signal 138 is that it serves as an ACLK input and LE (Latch Enable) input to the transceiver 11. Therefore, the ARMDLY2 signal 138 controls the latching of data on writes and the clocking of data on reads. Since the data phase controller 103 asserts the same signals for both reads and writes, the state machine is made much simpler. There is no delay in clocking read data out or in opening the latch to let write data in. The data is also given a head start through the transceiver 11 before all other handshake signals have been decoded. Finally, the hold time of the write data at the transceiver 11 is guaranteed since the latch operation of the transceiver 11 is closed well before the appropriate DI* or DK* signals (which indicate the latching of the data by the slave) are asserted on the bus 50, as will appear.

Figure 3A:
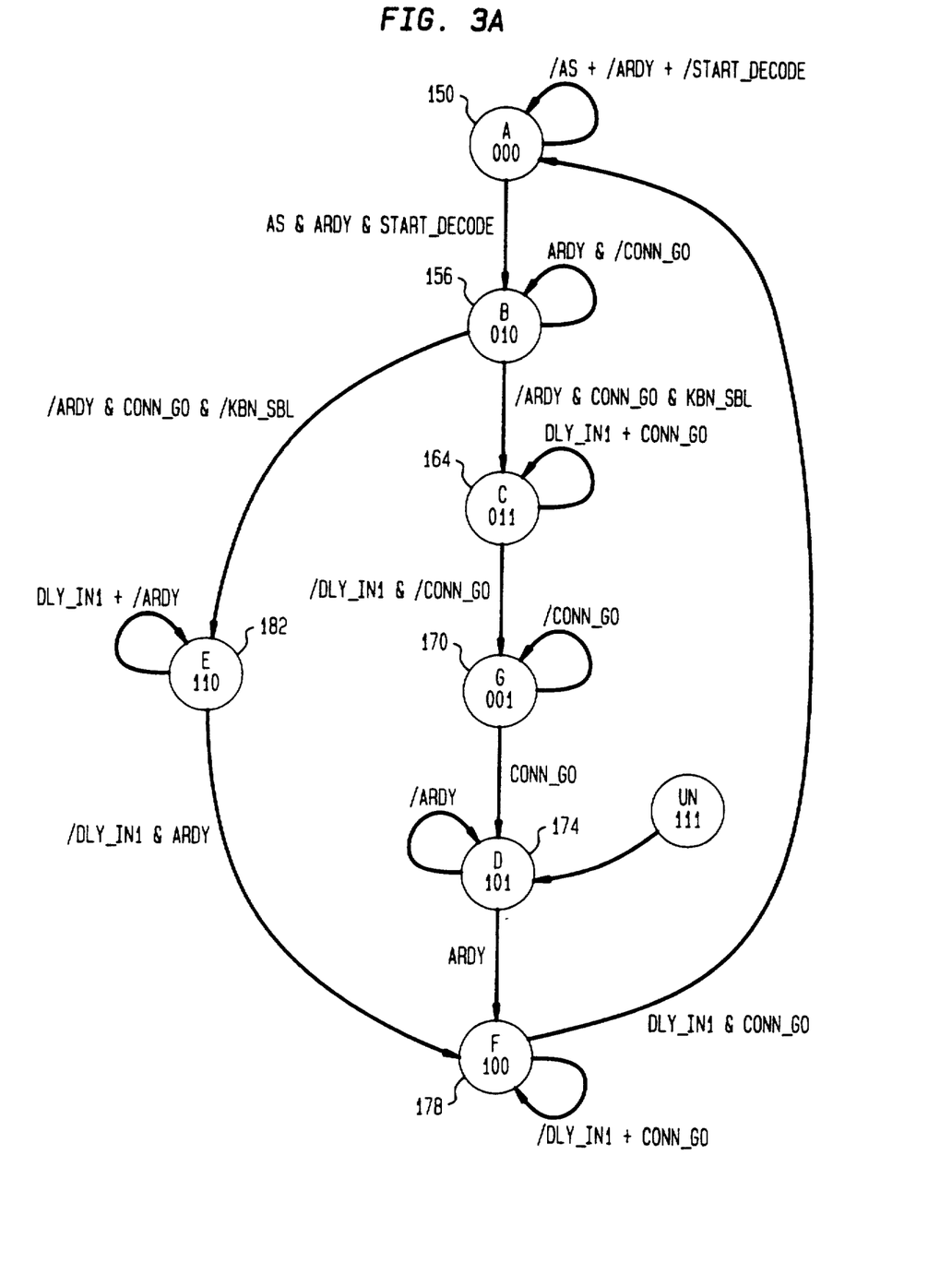
FIG. 3A illustrates a state diagram for the address phase controller of the asynchronous bus controller of FIG. 2.
Figure 3B:
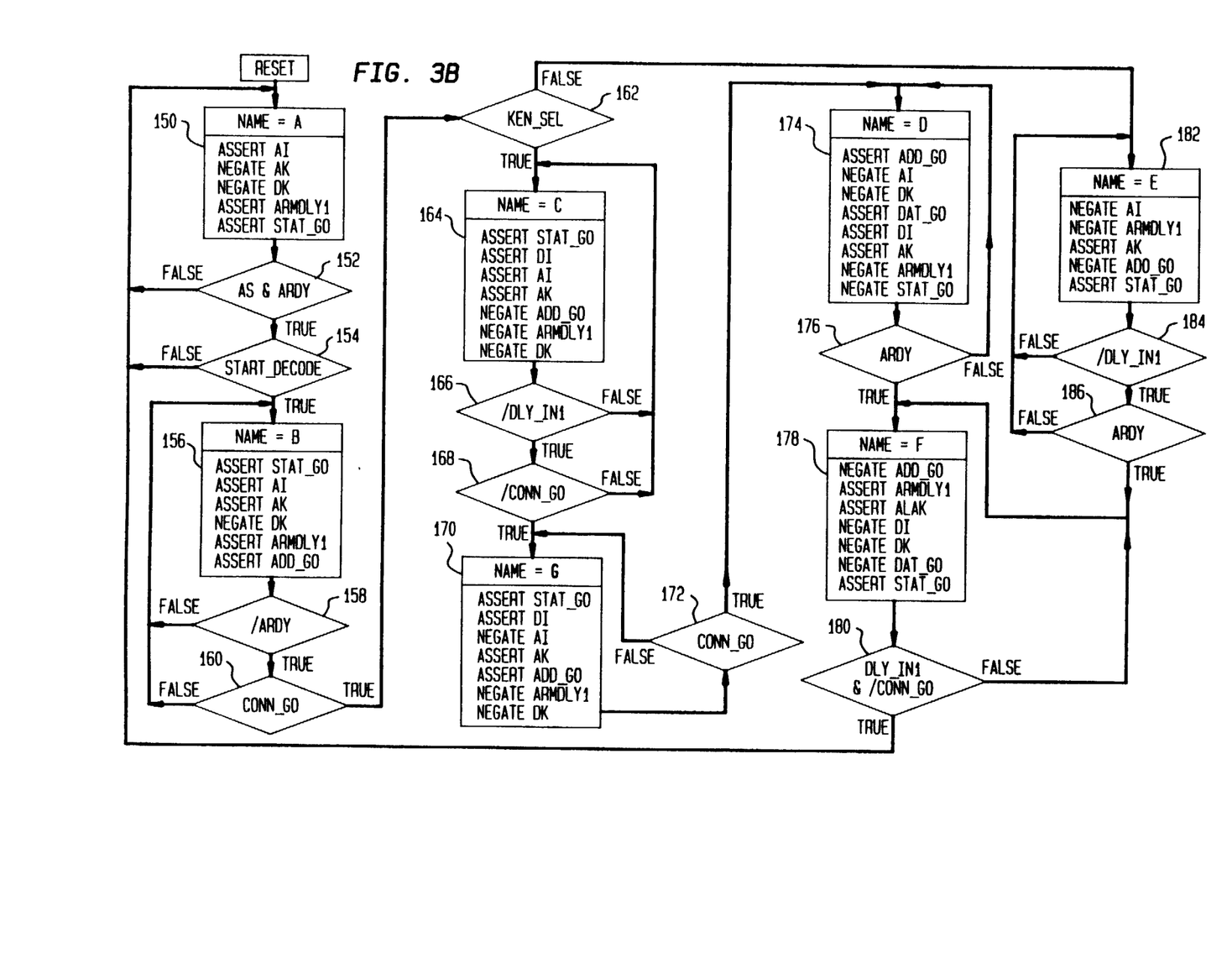
FIG. 3B illustrates a flow diagram for state transitions in the address phase controller of FIG. 2.

FIG. 3A illustrates a state diagram for the address phase controller 102 and FIG. 3B illustrates a flow diagram for state transitions in the address phase controller 102. Upon reset, the address phase controller 102 remains in state A 150, until each of the AS* signal 114 (controlled by the master on the bus 50), the ARDY signal 126 (controlled by the synchronous bus controller 13), and the START_DECODE signal 110 (controlled at reset by the data phase controller 103, as will be described below) is asserted. In state A 150, the AI* signal 116 (address acknowledge inverse) remains asserted, and each of the AK* signal 118 (address acknowledge) and DK* signal 124 (data acknowledge) remains negated. Also, in state A 150, the ARMDLY1 signal 134 is asserted as well as the STAT_GO signal 106.

When the slave 101 receives the AS* signal 114, the address on the bus 50 is latched through the transceiver 11 and decoded by the synchronous bus controller 13. Upon completion of address decode, the synchronous bus controller 13 asserts the ARDY signal 126.

A transition from state A 150 to state B 156 occurs when AS* signal 114 and the ARDY signal 126 are both asserted in decision block 152 and the START_DECODE signal 110 is asserted in decision block 154. In state B 156, each of the STAT_GO signal 106, ARMDLY1 signal 134, and AI* signal 116 remains asserted while the DK* signal 124 remains negated. The ADD_GO signal 104 is asserted and the AK* signal 118 is changed to an asserted state.

Figure 4A:
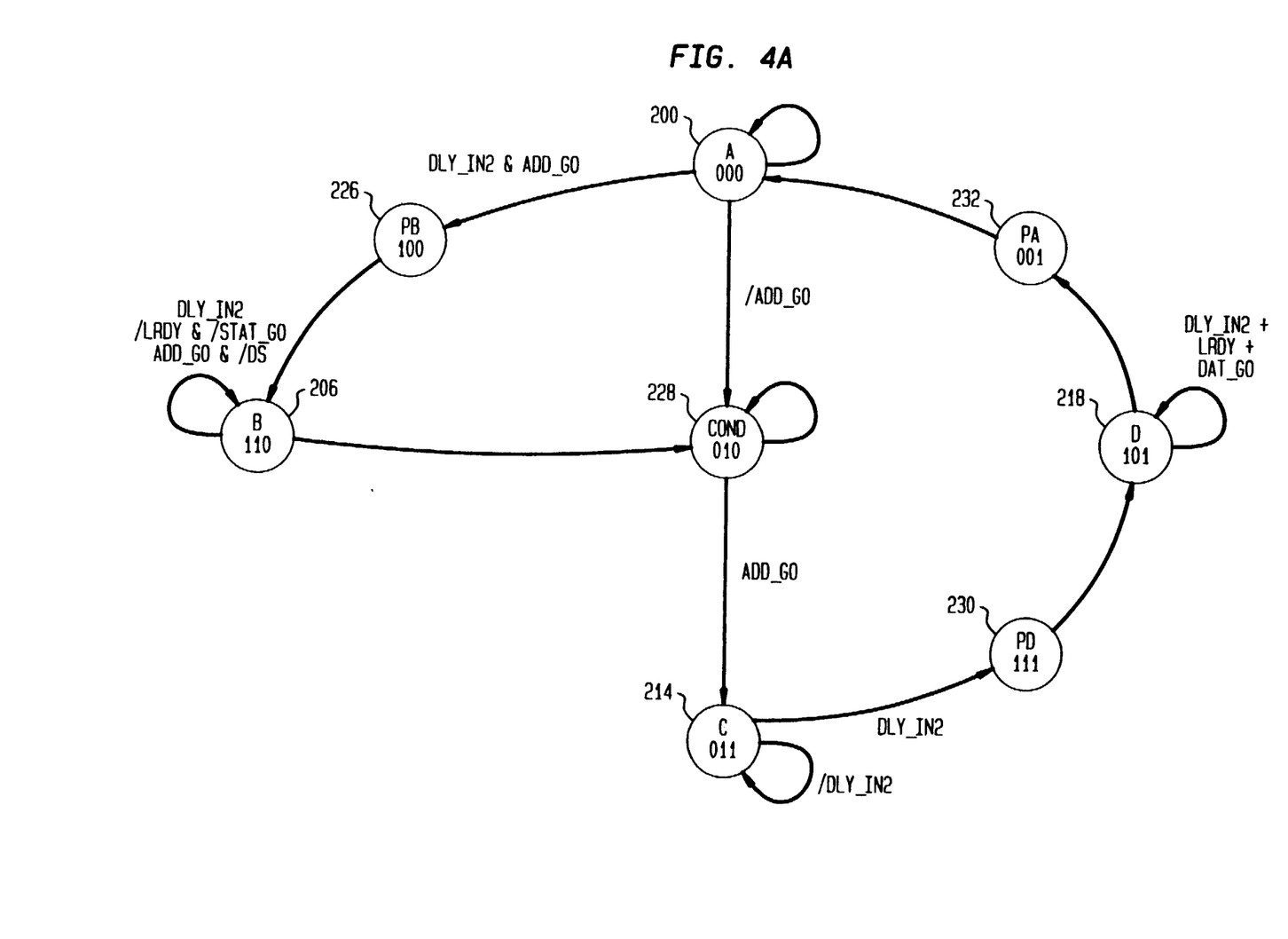
FIG. 4A illustrates a state diagram for the data phase controller of the asynchronous bus controller of FIG. 2.
Figure 4B:
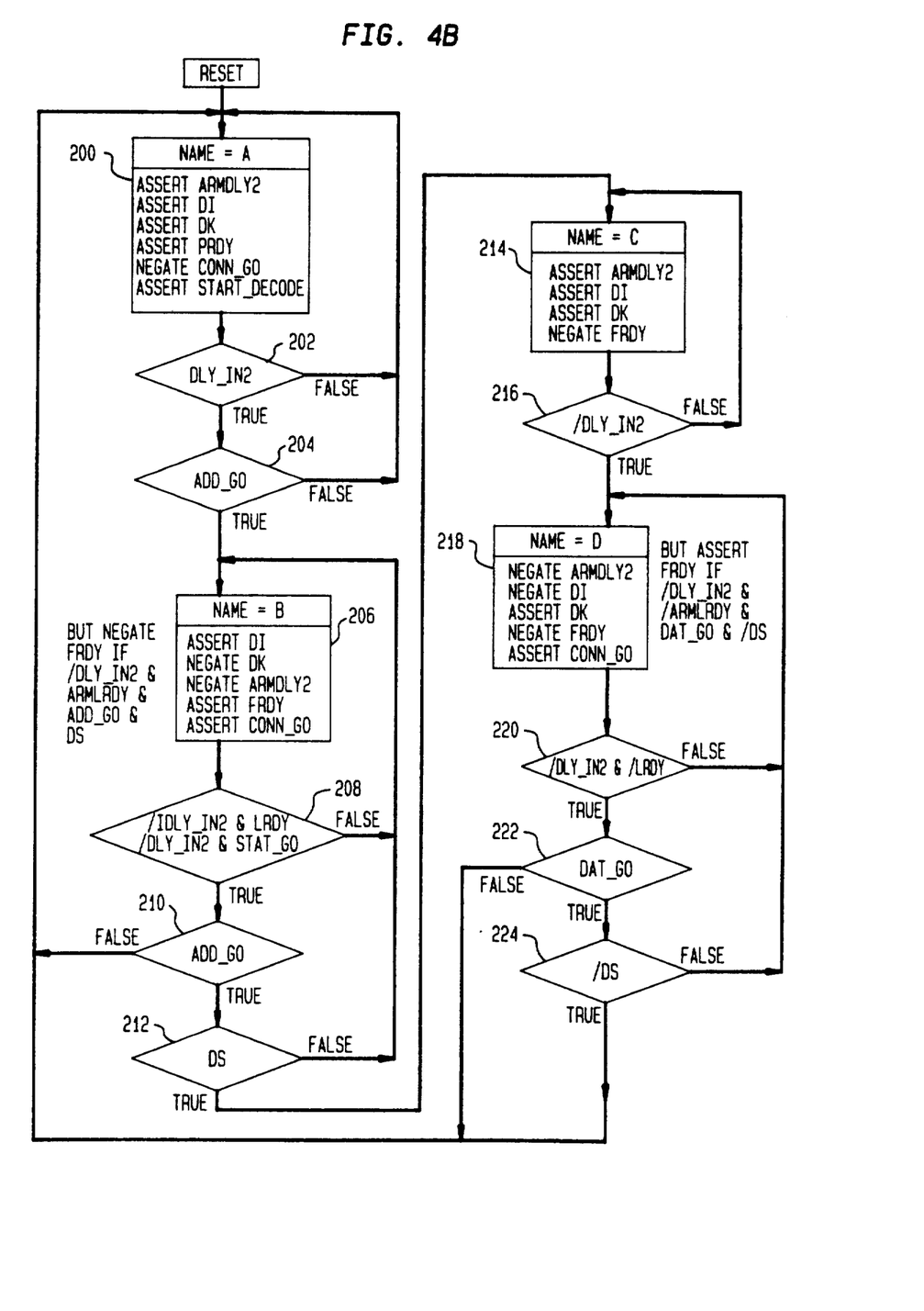
FIG. 4B illustrates a flow diagram for state transitions in the data phase controller of FIG. 2.

Referring now for a moment to FIGS. 4A and 4B, FIG. 4A illustrates a state diagram for the data phase controller 103 and FIG. 4B illustrates a flow diagram of the state transitions of the data phase controller 103. In state A 200 and upon reset of the data phase controller 103, the ARMDLY2 signal 138 is asserted which causes the DLY_IN2 signal 140 to be asserted 15 nsec. later. Moreover, each of the DI* signal 122, DK* signal 124, START_DECODE signal 110 and FRDY 130 signal is asserted and the CONN_GO signal 108 is negated. The state will change to state B 206 in the data phase controller 103 once the DLY_IN2 140 is received (15 nsec. after asserting the ARMDLY2 signal 138) in decision block 202 and the ADD_GO signal 104 is received from the address phase controller 102 in decision block 204 (see state B 156, FIGS. 3A and 3B). At state B 206 in the data phase controller 103, each of the DI* signal 122 and the FRDY signal 130 remains asserted. In addition, the CONN_GO signal 108 is asserted and the ARMDLY2 signal 138 and the DK* signal 124 are each negated.

Referring back to FIGS. 3A and 3B, the detection of the negation of the ARDY signal 126 by the synchronous bus controller 13 in decision block 158, the assertion of the CONN_GO signal 108 by the data phase controller 103 in decision block 160 and the assertion of the KEN_SEL signal 128 by the synchronous bus controller 13 in decision block 162 causes the state in the address phase controller 100 to change from state B 156 to state C 164. In state C 164, each of the AI* signal 116, AK* signal 118, and STAT_GO signal 106 remains asserted while the DK* signal 124 remains negated. In addition, the ARMDLY1 signal 134 is negated which will cause the DLY_IN1 signal 136 to be negated 20 nsec. later and the ADD_GO signal 104 is negated causing the data phase controller (see FIGS. 4A and 4B) to switch from state B 206 back again to the original state A 200 (see decision blocks 208 and 210). As described below, the ARMDLY2 signal 138 is coupled to transceiver 11. The transitions from state A 200 to state B 206 and back to state A 200 cause a rising and falling edge on the ARMDLY2 signal 138 in order to clock the status into the futurebus transceiver 95. Finally, the DI* signal 122 (data acknowledge inverse) is asserted to prepare for the data transfer phase. The 20 nsec. delay started by the ARMDLY1 signal 134 provides the synchronous bus controller 13 with sufficient time to assert status signals onto the bus 50, pursuant to the Futurebus protocol.

Once the negated DLY_13 IN1 signal 136 is detected by the address phase controller 102 in decision block 166 and the negated CONN_GO signal 108 in decision block 168, the state of the address phase controller 100 changes from state C 164 to state G 170 (CONN_GO 108 had been negated in state A 200 in the data phase controller 103, see FIG. 4B). In state G 170, each of the AK* signal 118, STAT_GO signal 106 and DI* signal 122 remains asserted while each of the DK* signal 124 and ARMDLY1 signal 124 remains negated. The AI* signal 116 signal (address acknowledge inverse) is negated indicating to the master 100 that the status and capability information on the bus, pursuant to the Futurebus protocol is valid. The ADD_GO signal 104 is asserted which causes the state of the data phase controller 103 to change from state A 200 to state B 206 (see FIGS. 4A and 4B).

As mentioned previously, state B 206 in the data phase controller 103 causes the CONN_GO signal 108 to become asserted. As illustrated in FIGS. 4A and 4B, the state of the address phase controller 102 will change from state G 170 to state D 174 when it sees the asserted CONN_GO signal 108 in decision block 172. In state D 174, each of the AK* signal 118, ADD_GO signal 104 and DI* signal 122 remains asserted while each of the AI* signal 116, DK* signal 124 and ARMDLY1 signal 134 remains negated. In addition, the STAT_GO signal 106 is negated and the DAT_GO signal 112 is asserted.

At this time, the connection phase is ended and the data transfer phase is ready to begin. The address phase controller 102 will remain in state D 174 until the data transfer phase is completed.

Figure 5:
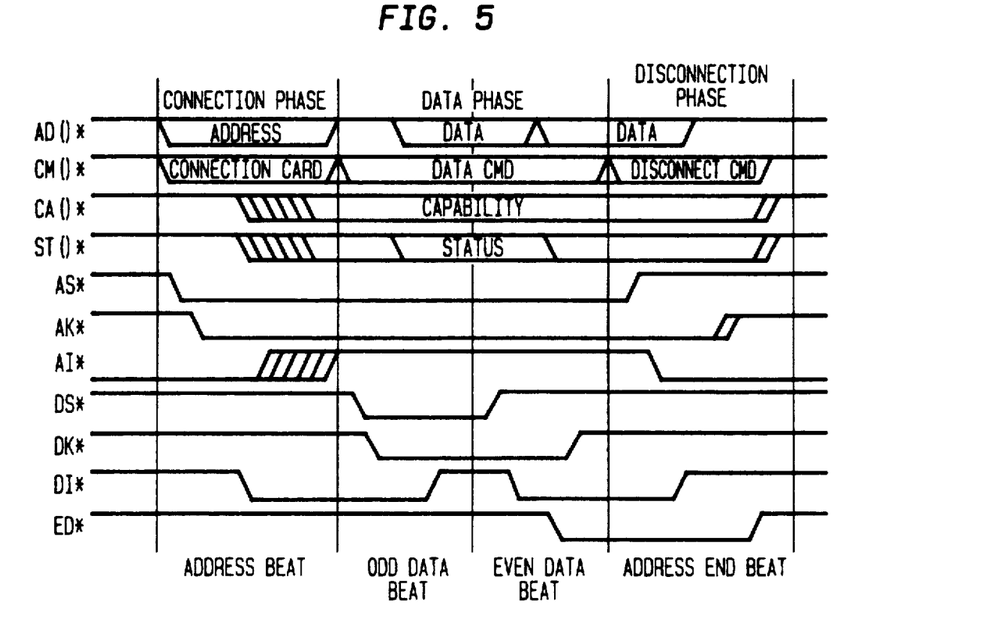
FIG. 5 is a timing diagram for a read data transfer over the bus of FIG. 1.

Referring to FIG. 5, a standard timing diagram for a compelled read data transfer according to the Futurebus protocol is shown. A read data transfer involves a read of data stored in the 101 by one of the masters 100. In this diagram an asserted line indicates that the signal on that line is a low signal (i.e., logic 0). Conversely a negated line indicates that the signal on that line is a high signal (i.e., logic 1). As mentioned previously, an assertion of the AS* signal 114 indicates that valid address and command data is on the bus 50. This transition is followed by an assertion of the AK* signal 118. Some time later the AI* signal 116 is negated indicating that the slave's status and capability data is valid on the bus 50. The negation of the AI* signal 116 also indicates the end of the connection phase.

During the data transfer phase, the slave 101 asserts the DK* signal 124 after receiving the asserted DS* signal 120 from the master 100. The slave 101 then places the requested data into its transceiver 11 and negates the DI* signal 122 indicating that valid read data is on the bus 50. This transition of the DS* 120, DI* 122, and DK* 124 signals is referred to as an ODD beat. During an EVEN beat, the DS* signal 120 is negated by the master 100 and, in response, the DI* signal 122 is asserted by the slave 101. The DK* signal 124 is negated by the slave when the slave has placed valid read data on the bus 50. During the data transfer phase, ODD and EVEN beats alternate until the master 100 negates the AS* signal 114, indicating that no more read data is to be transferred.

At the completion of the disconnection phase, the DS* signal 120 remains negated as does the DK* signal 124.

During the disconnection phase, the master 100 places valid disconnect command data on the bus 50 and negates the AS* signal 114. The AI* signal 116 is asserted soon after. When the AK* signal 118 is negated by the slave, status information on the bus 50 from the slave 101 is valid. The negation of the AK* signal 118 also indicates the end of the disconnection phase.

Figure 6:
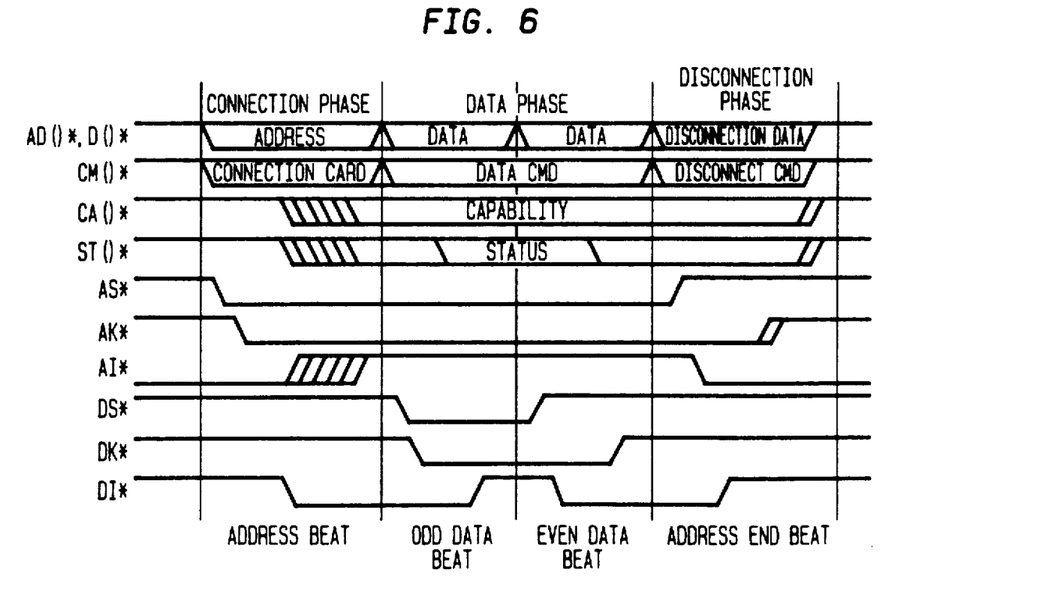
FIG. 6 is a timing diagram for a write data transfer over the bus of FIG. 1.

Referring to FIG. 6, a standard timing diagram for a compelled write data transfer according to the Futurebus protocol is shown. A write data transfer involves a write of data by one of the masters 100 to the slave 101. Comparing the timing diagram of FIG. 6 with the one of FIG. 5 indicates that the timing of the AS* 114, AK* 118, AI* 116, DS* 120, DK* 124, and DI* 122 signals is similar. The notable difference between the two diagrams is the earlier timing of valid data on the bus 50 during the write operation.

During an ODD beat of a write data transfer the master asserts the DS* signal to indicate that valid write data is on the bus 50. When the slave sees the asserted DS* signal, it asserts DK* and captures the data through the transceiver 11. The slave 101 then negates DI* to indicate that it has captured the write data. During the EVEN beat, the master negates DS* to again indicate that valid write data is on the bus 50. When the slave 101 sees the negation of DS*, it asserts DI* and again captures the write data on the bus 50. Thereafter the slave 101 negates DK* to notify the master that it has captured the data.

During the data transfer phase, ODD and EVEN beats alternate until the master 100 negates the AS* signal 114, indicating that no more read data is to be transferred. The connection and disconnection phases of the write transfer are similar to the read transfer.

Referring to FIGS. 4A and 4B, the data phase controller 103 remains in state B 206 until the DS* signal 120 is received from the master 110 on the bus 50 in decision block 212. The state then changes to state C 214 where the DI* signal 122 remains asserted and the ARMDLY2 signal 138 is asserted. The DK* signal 124 (data acknowledge) is asserted indicating that the slave 101 is ready to transfer information to/from the bus 15. The FRDY signal 130 is negated. The FRDY signal 130 indicates to the synchronous bus controller 13 that another read or write request is forthcoming.

In decision block 216, once the DLY_IN2 signal 140 is returned to the data phase controller 103 (as a result of asserting the ARMDLY2 138 signal) the state is changed from state C 214 to state D 218. In state D 218, each of the DK* signal 124 and CONN_GO signal 108 remains asserted while the FRDY 130 signal remains negated. The ARMDLY2 signal 138 is negated which will result in a negated DLY_IN2 signal 140 15 nsec. later. The DI* signal 122 is negated to indicate that data has been latched in from the bus 50 or sent to the bus 50.

The data phase controller 103 transitions from state C 214 to state D 218 during the ODD beat of the data write or read. In the EVEN beat, the DS* signal 120 changes to a negated state (see decision block 224) and the data phase controller 103 transitions through state A 200 and B 206. In decision block 222 the DAT_GO 112 signal is still asserted (from state D 170 of the address controller 102). The state changes from state D 218 to state A 200 as long as LRDY is asserted, indicating that the synchronous bus controller 13 is ready (see decision block 220). In state A 200, the DI* signal 122 and the ARMDLY2 signal 138 are each asserted. Since the ADD_GO signal 104 is still asserted (from state D 174 of the address phase controller 102), the state changes from state A 200 to state B 206 after the DLY_IN2 signal is received 15 nsec. later (see decision block 202) where the DK* signal 124 is negated do indicate that the data has been latched in or sent to the bus 50. The data phase controller 103 continues jumping from state to state and between ODD and EVEN beats until the AS* signal 114 is negated by the master indicating that no more data is to be read or written.

Referring back to FIGS. 3A and 3B, the address phase controller 102 remains in state D until the synchronous bus controller 13 returns an ARDY signal informing the address phase controller 102 that the AS* signal from the master 100 has been negated to indicate the disconnection (see decision block 176). Upon receiving the ARDY signal 126, the state changes from state D 174 to state F 178. In state F 178, the AK* signal 118 remains asserted while the DK* signal 124 remains negated. The AI* signal 116 is asserted indicating the disconnection phase has started. The ARMDLY1 signal 134 is asserted resulting in the receipt of the DLY_IN1 signal 136 20 nsec. later. The STAT_GO signal 106 is asserted and each of the ADD_GO signal 104 and the DAT_GO signal 112 is negated indicating the disconnection phase to the data phase controller 103.

Negation of each of the ADD_GO signal 104 and the DAT_GO signal 112 will cause the data phase controller 103 to remain in state A 200 (see decision blocks 204 and 222 of FIG. 4B). The DI* signal 122 is negated indicating that no more reading or writing will be done until another AS* signal 114 is received from the master. The DAT_GO signal 112 is negated which also places the data phase controller 103 into its A state 200.

In state A 200 of the data phase controller 103, the CONN_GO signal 108 is negated. The address phase controller 102 remains in state F 178 until the negated CONN_GO signal 108 is received from the data phase controller 103 (see decision block 180). Both controllers 102, 103 are now in their respective reset states and ready for the next read or write operation.

One further branch exists in the state transition flow of the address phase controller 102 which is executed if the slave 101 has not been selected. In decision block 162, if the KEN_SEL signal 128 has not been asserted by the synchronous bus controller 13 to indicate that the slave 101 has not been selected as such then the state changes from state B 156 to state E 182.

In state E 182, the AK* signal 118 and the STAT_GO signal 106 remain asserted. Each of the AI* signal 116, ARMDLY1 signal 134, and ADD_GO signal 104 is negated. Because the ADD_GO signal 104 is negated, the data phase controller 103 will remain in state A 200 (see FIGS. 4A and 4B) and never reach the data transfer phase. Upon receipt of the ARDY signal 126 from the synchronous bus controller 13 in decision block 186 and receipt of the negated DLY_IN2 signal in decision block 184, the state changes from state E 182 to state F 178. Therefore, once the master 100 has initiated a read or write request, the address phase controller 102 will return back to the reset state A 150.

Referring to FIG. 4A, each cycle state is defined by three state variables. The first of these variables is the ARMDLY2 signal 138. As mentioned previously, this signal is the first to change. As can be seen in FIG. 4A, each change in ARMDLY2 138 causes the state to change from a stable state to one of four cycle states 226, 228, 230, and 232. Before the connection phase is complete, the data phase controller 103 changes from state A 200 to state B 206 and back to state A 200. This is done in order to get a rising edge on the input to the transceiver 11. Without cycle states, two state variables may have next states at the same time leading to an unwanted next state. With the states shown in FIG. 4A only one state variable can be changed at a time in order to change states.

Figure 7A:
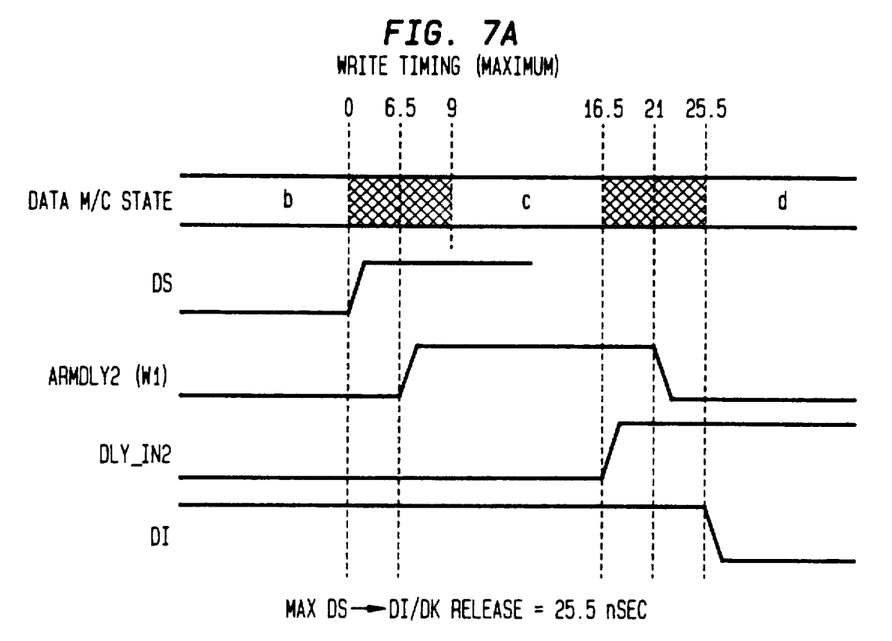
FIGS. 7A and 7B are additional timing diagrams for write and read data transfers over the bus of FIG. 1.
Figure 7B:
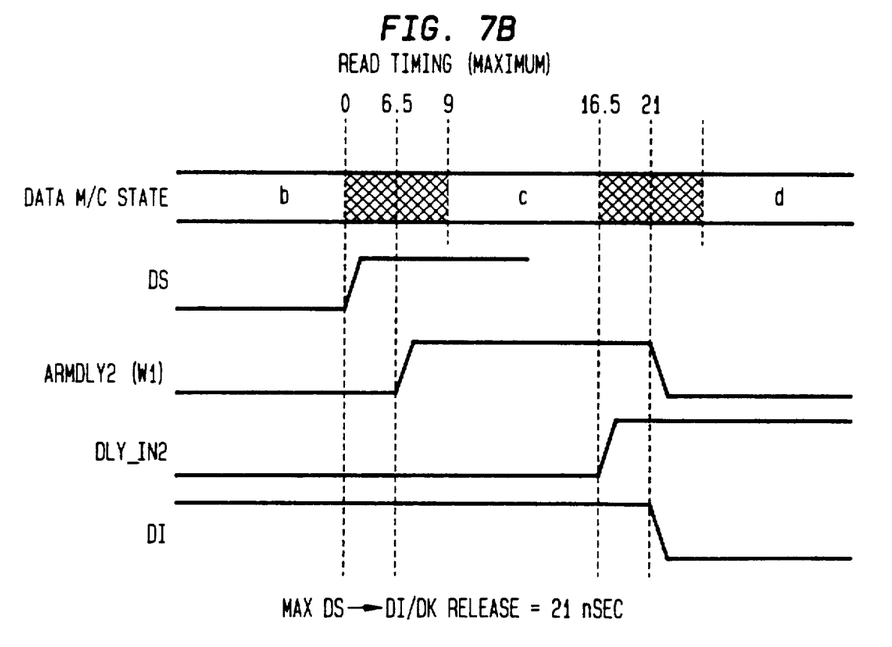

Referring to FIGS. 7A and 7B, more detailed timing diagrams for write and read operations are shown. As mentioned previously, an ODD or EVEN beat in the data transfer phase begins with a transition of the DS* signal 120. For this embodiment of the invention, 4.5 nsec. PALs are used. Referring to FIG. 7A, one PAL delay (4.5 nsec.) takes place between the transition of the DS* signal 120 and the transition of the ARMDLY2 signal 138. This signal starts off a 12 nsec. delay, for example, resulting in another transition of the ARM- DLY2 signal 138 one PAL delay later. Finally, the DI* signal 122 is negated one more PAL delay later. This results in a total 25.5 nsec. time span between the DS* transition and the release of either the DI* signal 122 or the DK* signal 124, depending on the type of data beat being executed.

Referring to FIG. 7B, the timing diagram for a read operation is shown. The timing is similar except that the transition of the DI* signal 122 occurs simultaneously with the ARMDLY2 signal 138. This one PAL delay savings is due to the fact that the data transceiver 11, which can be implemented in a DS3886 transceiver, is a flip-flop in the read direction and a latch in the write direction. Upon receipt of a negated ARMDLY2 signal 138, the DI* and DK* signals are decoded directly from the stable state and the input condition, rather than the transition state. Thus, on reads, the DS* to DI*/DK* turnaround time by this interface is one PAL delay faster than for writes. On a read operation, a total 21 nsec. time span exists between the DS* transition and the release of either the DI* 122 or DK* 124 signals, depending on the type of data beat being executed.

Figure 8:
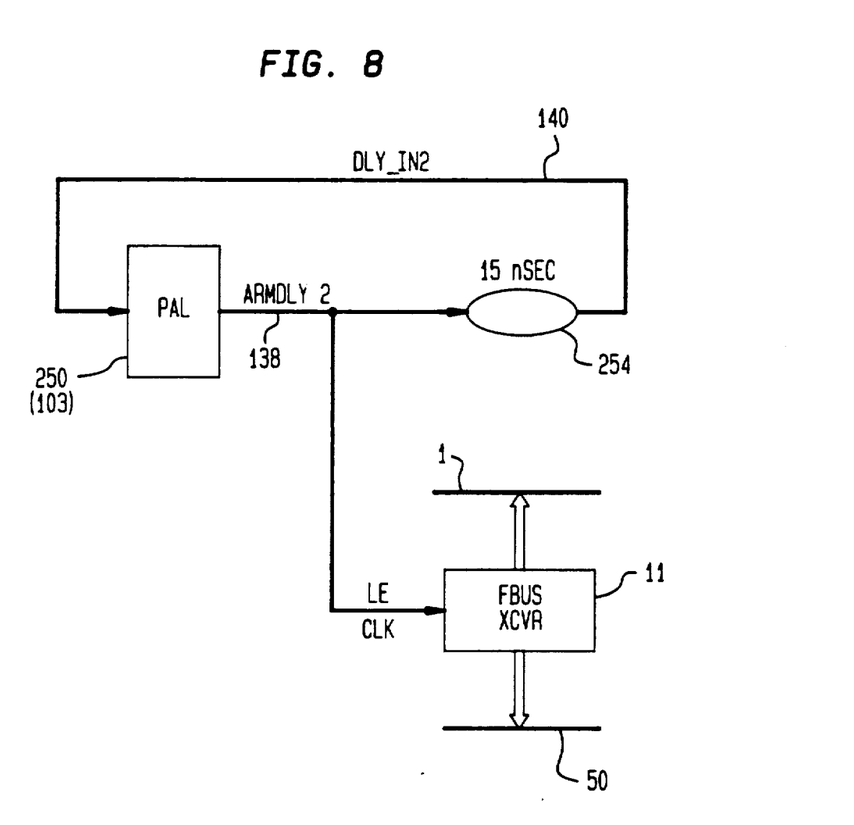
FIG. 8 illustrates a detail of the data phase controller of the asynchronous bus controller of FIG. 2.

Referring to FIG. 8, the connection of the ARMDLY2 signal to the transceiver 11 is shown. The data phase controller 103 is implemented as a PAL 250. As mentioned previously, the PAL 250 can comprise a 4.5 nsec. 16L8 PAL. The state transition signal received by the PAL 250 is the DLY_IN2 signal which is delayed 12 nsec. from the ARMDLY2 signal using a delaying device 254. However, the ACLK input and LE (Line Enable) input of the transceiver 11 are each coupled directly to the ARMDLY2 output of the PAL 250 so that read and write data are immediately available at the transceiver 11 for transfer onto or from the bus 50.

The synchronous bus controller 13 and asynchronous bus controller 15 arrangement of the present invention provides a high speed interface to the bus 50 through the use of 4.5 nsec. PALs for rapid execution of Futurebus transactions involving the slave 101. This facilitates the prompt completion of the bus transactions required during the operation of the asynchronous bus 50.

What is claimed is:

1. An interface controller capable of being coupled between an asynchronous bus and a slave device, the asynchronous bus including address/data lines and handshaking signal lines and operating according to a bus protocol including a plurality of phases with handshaking signals on the handshaking signal lines to control the transition of phases on the asynchronous bus, the handshaking signals being asserted on the bus asynchronously, the interface controller comprising:

an asynchronous bus controller capable of being coupled to the handshaking signal lines of the asynchronous bus, the asynchronous bus controller comprises first and second state machines coupled together, the first and second state machines cooperatively operating with one another to asynchronously detect, and asynchronously generate and transmit handshaking signals on the handshaking signal lines of the asynchronous bus during certain ones of the phases to distribute handshaking signal processing among the first and second state machines, and each of said first and second state machines operating to detect and generate and transmit status signals between said state machines; and a transceiver asynchronously coupled to at least one of the state machines and capable of being coupled to each of the address/data lines of the asynchronous bus and the slave device, such that said transceiver can receive and transmit address and data information between the slave device and the address/data lines of the asynchronous bus under the control of at least one state machine.

2. The interface controller of claim 1, wherein each of the state machines comprises a programmable array logic device.

3. An asynchronous bus controller in a computer system, said computer system comprising:
   a master device;
   a slave device;
   an asynchronous bus coupling said master device to said slave device and coupled to said asynchronous bus controller, the asynchronous bus operating according to a predetermined protocol where handshaking signals are asynchronously passed between said master device and said slave device, the protocol including a plurality of phases, the phases transitioning from one to another asynchronously, the phases comprising:
   1) a connection phase where said master selects and establishes an asynchronous bus connection between the master and a desired slave;
   2) a data transfer phase where data is transferred between said master and said desired slave; and
   3) a disconnection phase here the master terminates transfer of data between the master and desired slave and breaks said asynchronous bus connection;
   the asynchronous bus controller comprising first and second state machines, said state machines cooperatively operating with one another to asynchronously receive and generate the handshaking signals of the bus protocol, such that said first state machine asynchronously controls said connection and disconnection phases of the bus, and said second state machine asynchronously controls said data transfer phase of the bus to distribute handshaking signal processing among the first and second state machines, and each of said first and second state machines operating to detect and generate and transmit status signals between said state machines.

4. The asynchronous bus controller of claim 3, wherein said first and second state machines comprise respective first and second programmable array logic devices.

5. The asynchronous bus controller of claim 4, wherein said asynchronous bus controller is coupled within said slave device and said master device asserts a plurality of signals:
   an address synchronization signal indicating that addressing information placed on the asynchronous bus is valid, said address synchronization signal indicating the beginning of the connection phase; and
   a data synchronization signal indicating data information placed on the asynchronous bus is valid, in the case of said master writing data to said slave, and said data synchronization signal indicating a request by the master for more data from the slave, in the case of said master reading data from said slave;
   said asynchronous bus controller in said slave asserts a plurality of signals:
   address acknowledge signals indicating the receipt of address information by the slave from the master, said address acknowledge signals indicating the completion of said connection and disconnection phases; and data acknowledge signals indicating the receipt of data information by the slave from the master, in the case of said master writing data to said slave, said data acknowledge signals indicating that data information from the slave is valid on the asynchronous bus, in the case of said master reading data from said slave;

said first state machine controls said address acknowledge and said data acknowledge signals during said connection and disconnection phases and said second state machine controls said data acknowledge signals during said data transfer phase.

6. The asynchronous bus controller of claim 5, wherein said asynchronous bus controller is coupled to a transceiver in said slave, said transceiver capable of being coupled to each of the address/data lines of the asynchronous bus and the slave device, such that said transceiver can receive and transmit address and data information between the slave device and the address/data lines of the asynchronous bus under the control of said first and second state machines, each of said first and second state machines comprises a plurality of state variables, such that one of said state variables in at least one of said first and second state machines is coupled to said transceiver and controls the receiving and transmission of data information in said transceiver.

7. The asynchronous bus controller of claim 5, wherein each of said first and second state machines comprises a plurality of state variables, such that stable state transitions in at least one of said first and second state machines occur by first toggling a first state variable, such that said state machine changes from a stable state to a cycle state, said asynchronous bus controller further comprising:

a first delay device having an input and an output coupled to said state machine such that said first state variable of said state machine is supplied to said input of said first delay device and said output of said first delay device is coupled to said state machine, such that a toggling of said output of said first delay device causes said state machine to change from a cycle state to a stable state.

8. The asynchronous bus controller of claim 5, wherein said computer system further comprises:

a transceiver coupled to at least one of the state machines and capable of being coupled to each of the address/data lines of the asynchronous bus and the slave device, such that said transceiver can receive and transmit address and data information between the slave device and the address/data lines of the asynchronous bus under the control of at least one state machine;

a synchronous bus coupled to said transceiver and said slave device; and a synchronous bus controller coupled to each of said asynchronous bus controller, said asynchronous bus, and said transceiver, said synchronous bus controller controls phase transitions on said synchronous bus;

said synchronous bus controller synchronizes phases of said synchronous bus with phases of said asynchronous bus, said synchronous bus controller sends a first handshaking signal to said second state machine when data is imminent at said transceiver, in the case of said master writing data to said slave device, said synchronous bus controller sends a first handshaking signal to said second state machine when data is soon to be latched in said transceiver, in the case of said master reading data from said slave device, said asynchronous bus controller further comprising:

a second delay device having an input and an output coupled between said synchronous controller and said second state machine such that said first handshaking signal is supplied to the input of said second delay device;

said second state machine sends a second handshaking signal to said synchronous bus controller upon receipt of said data synchronization signal from said asynchronous bus;

said output of said second delay device is supplied to said second state machine such that said output of said second delay device and said second handshaking signal in said synchronous bus controller controls the receiving and transmission of data information in said transceiver.

* * * * *